Sept. 28, 1965  E. F. McBRIEN  3,209,114
VARIABLE INDUCTANCE DEVICE FOR CONTROL OF POWER
IN AN INDUCTION HEATING APPARATUS
Filed Aug. 1, 1962

INVENTOR.
EDWARD F. McBRIEN
BY *Tilbery and Body*
ATTORNEYS

# United States Patent Office 3,209,114
Patented Sept. 28, 1965

3,209,114
VARIABLE INDUCTANCE DEVICE FOR CONTROL OF POWER IN AN INDUCTION HEATING APPARATUS
Edward F. McBrien, Parma, Ohio, assignor to The Ohio Crankshaft Company, Cleveland, Ohio, a corporation of Ohio
Filed Aug. 1, 1962, Ser. No. 213,974
4 Claims. (Cl. 219—10.75)

The present invention pertains to the art of induction heating and more particularly to a device for individually controlling the power at each of a plurality of induction heating stations which are supplied with power by a single generator.

The present invention is particularly adapted for controlling the amount of power and maintaining a substantially constant power factor at one of a plurality of induction heating stations, each of which are used to heat metal workpieces and are supplied with power by a single generator; however, it is to be appreciated that the invention has much broader applications and may be used to control the amount of power and/or to maintain a substantially constant power factor of the voltage supplied to various induction heating devices, such as induction melting furnaces.

Induction heating loads, such as presented when an inductor is used in heating a metal workpiece, usually impose a badly lagging power factor on the power source, and it has been the accepted practice to correct such lagging power factor by connecting one or more capacitors in parallel across the induction heating load. Although the power factor of the induction heating load was corrected at the beginning of the heating cycle, changes in the temperature of the workpiece and other electrical characteristics of the heating operation often caused further deviation of the power factor from unity and it was then necessary to adjust the amount of capacitance in parallel across the inductive load to again correct the power factor. Thus, periodically the power factor deviation had to be observed and appropriate changes were made in the amount of capacitance across the load in order to maintain a substantially unity power factor. This problem was greatly increased when a plurality of inductive loads were connected across and received power from a single generator. In this instance, each inductive station was separately controlled in order to maintain even an approximation of unity power factor at the supply generator. Further, when a plurality of induction heating stations were connected to a single supply generator, it was extremely difficult to allocate the proper power to each station, especially, when the power requirement of the various stations was not substantially the same.

In the past, when a plurality of induction heating stations were connected to a single generator, the power factor at each station and the amount of power supplied to each station was controlled by trial and error methods until an approximation of the desired conditions were reached. Thereafter, the whole system was thrown out of balance when the power requirements of one heating station changed. The disadvantages of such a situation are obvious. One suggested solution was to incorporate saturable reactors in parallel and in series with each induction heating station. This solution was not completely successful because of the inherent non-linearity of the saturable reactor. Since the input wave form, i.e. the sine wave, was distorted by saturation of the iron core of the saturable reactor, the heating characteristics could not be predicted by the usual linear network theory of electrical computations which theory is based on uniformly varying wave shapes. Further, because of the discontinuity of the wave shape through the saturable reactor, linear differential equations are completely inadequate for predicting the operation of the heating stations. Consequently, the selection of proper circuit components for use with the saturable reactor was very difficult; and, as the saturation point was changed, the wave form was further distorted and previous calculations for selecting the proper components were completely inaccurate. Meters used in adjusting the circuit parameters of the heating stations are calibrated for sine wave voltages and currents; therefore, distortion caused by the saturable reactors in the heating station prevents accurate metering of the electrical conditions in the separate stations. The saturable reactors in the heating circuits cause harmful harmonics and saturable reactors could not be used in installations where the current was to vary over a large range, i.e., 10-100 amperes, which limitations further distract from any ability which the saturable reactors may have to control the power to the separate stations.

In the past, linear, variable inductance devices have not been used to control the power distribution in an induction heating installation wherein a plurality of heating stations are connected to a single supply generator. The term "linear, variable inductance devices" as used herein refers to an inductance device that has uniform, i.e., linear, affect on the wave shape of the current passing therethrough, as is distinguished from a non-linear device, such as a saturable reactor. In a linear, variable inductance device a sine wave input results in a sine wave output and the disadvantage of a non-linear device resulting from the characteristics of non-linearity are eliminated.

In order to control the power factor and power distribution of such a system, it is necessary to provide a means for widely varying the parameters of the heating circuit and, heretofore, the linear, variable inductance devices did not have a power rating and a range of adjustment sufficient to allow proper control of power distribution or maintain a constant power factor at the multiple stations connected to a single generator. Consequently, the use of a linear, variable inductance device was completely foreign to control of multi-station induction heating installations. The present invention is directed toward a linear, variable inductance device which has a high power rating and allows a relatively large range of inductance variation and also to the concept of employing such a device in the induction heating apparatus to accomplish the above-mentioned results.

These and other disadvantages are overcome by the present invention which is directed to a linear, variable inductance device for controlling the distribution of power and for controlling the power factor in an induction heating device, and especially in an induction heating device of the type wherein a plurality of induction heating loads are connected to a single supply generator.

In accordance with the present invention there is provided a linear, variable inductance device for controlling the power supplied to and/or the power factor of an induction heating apparatus which device comprises a first and a second coil connected in series, wherein the first coil has an axial opening and there is provided means for progressively moving the second coil axially into the opening of the first coil to control the inductive reactance, or inductance, across both coils.

The primary object of the present invention is the provision of a linear, variable inductance device for controlling the power to an induction heating station and/or for maintaining a substantially unity power factor at this station.

Another object of the present invention is the provision of a linear, variable inductance device for controlling the power factor to each of a plurality of induction heating stations supplied with power by a single generator.

Still another object of the present invention is the provision of a linear, variable inductance device for maintaining a substantially constant power factor at each of a plurality of induction heating stations supplied with power by a single generator.

Another object of the present invention is the provision of a linear, variable inductance device for controlling the power distribution to a plurality of induction heating stations supplied with power by a single generator and for maintaining a substantially constant power factor at the generator, which device has a high ratio of maximum to minimum inductance over the adjustable range.

Still another object of the present invention is the provision of a linear, variable inductance device for controlling the power distribution to each of a plurality of induction heating stations supplied with power by a single generator and for maintaining a substantially constant power factor at the generator, which device has a high ratio of maximum to minimum inductance over the adjustable range and has a relatively low minimum inductance.

A further object is the provision of a linear, variable inductance device for controlling the power distribution and power factor at each of a plurality of heating stations supplied with power by a single generator, which device includes two concentric, axially adjustable coils connected in series.

Another object of the present invention is the provision of a linear, variable inductance device for controlling power distribution and power factor at each of a plurality of induction heating stations supplied with power by a single generator, which device includes two concentric, axially adjustable coils connected in series wherein the windings of one coil are opposite in mechanical pitch to the windings of the other coil for substantially increasing the ratio of maximum to minimum inductance over the adjustable range and across the two coils.

A still further object of the present invention is the provision of a linear, variable inductance device having a high ratio of maximum to minimum inductance in the adjustable range and having a relatively low minimum inductance, which device is connected in series across one of a plurality of induction heating stations supplied with power by a single generator to control the power distribution to this station.

Another object of the present invention is the provision of a linear, variable inductance device with a high ratio of maximum to minimum inductance in the adjustable range and having a low minimum inductance, which device is connected in parallel across one of a plurality of induction heating stations supplied with power by a single generator to maintain substantially a constant power factor at the generator.

These and other objects and advantages will become apparent from the following description used to illustrate the preferred embodiment of the invention as read in connection with the accompanying drawing in which.

Figure 1:
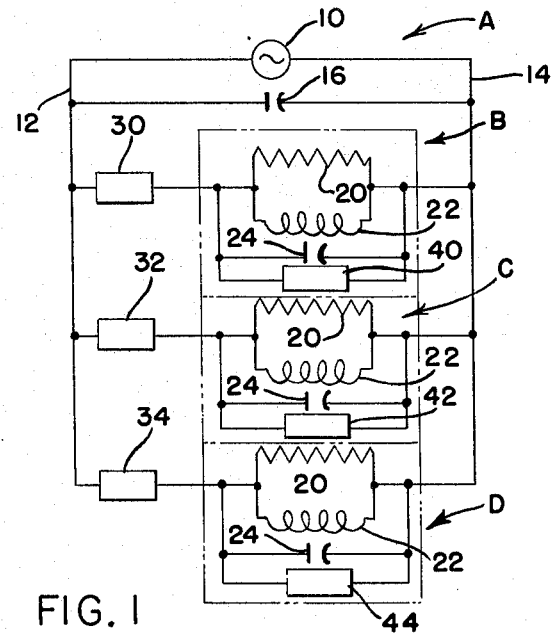
FIGURE 1 is a circuit diagram illustrating an embodiment of the present invention.

Referring now to the drawings, wherein the showings are for the purpose of illustrating preferred embodiments of the invention only and not for the purpose of limiting same, FIGURE 1 shows an induction heating apparatus A comprising a plurality of induction heating stations B, C, D, shown in phantom lines and generally of the type used to individually heat ferro-magnetic workpieces for hardening, annealing and similar purposes. The separate induction heating stations are supplied with power from a single generator 10 having outlet leads 12, 14 appropriately connected to the separate induction heating stations in a manner well known in the art of induction heating. Each of the stations B, C, and D are connected in parallel across the leads 12, 14, and, as is commonly known, each of the induction heating stations has a high inductive reactance which causes a seriously lagging power factor; therefore, as is known in the art, there is provided a bank of capacitors, represented by capacitor 16, which are used to maintain the power factor across the leads 12 and 14 at substantially unity to prevent inefficient operation of the generator. The capacitor bank 16 usually comprises a plurality of individual capacitor cans that can be connected across the leads 12, 14 in appropriate combinations to vary the amount of corrective capacitance as the inductive reactance of the various loads changes.

Referring to the stations B, C and D in more detail, the stations usually comprise an induction heating coil which induces a voltage into the workpiece for heating thereof and, for simplicity, the electrical characteristics of the stations can be represented by a parallel arrangement of a resistance 20 and an inductive reactance 22. Incorporated in each station there is usually provided an individual power factor controlling capacitor 24 to operate in conjunction with the capacitor bank 16 to assist further in correcting the power factor at the generator 10. The capacitors 24 may include a plurality of individual capacitors which are adapted to be arranged in a given combination to correct the lagging power factor of the separate stations.

As so far explained, the induction heating apparatus A does not substantiallyl differ from known induction heating apparatus wherein a plurality of induction heating stations were supplied with power from a single supply generator. These prior apparatus had serious disadvantages, for instance, the inductance 22 would change radically while heating a ferro-magnetic workpiece, especially as the workpiece passed through the Currie point. Such rapid changes in the inductive reactance of the individual stations required a considerable change in the power factor correcting capacitors 16, 24. This required a substantial number of capacitors and an elaborate switching arrangement, since the capacitors were not infinitely variable and adjustment of the capacitance required a series of finite steps. As the number of the stations increased, the task of changing the capacitors was greatly complicated. Further, since the capacitors were not variable, it was often found that the desired power factor could not be accurately reached and only approximation of the proper power factor was obtained. It was found that the different stations often had widely varying power requirements and there was no simplified way for changing the power distribution to the separate stations.

The present invention is directed toward the use of a linear, variable inductance device which is easily incorporated into the induction heating apparatus A for controlling the distribution of power from the single generator to the individual stations and for maintaining substantially constant power factor at the generator 10. Although various arrangements can be provided for incorporating the linear, variable inductance device into the electrical system of the induction heating apparatus A, in accordance with the preferred embodiment of the present invention, linear, variable inductance devices 30, 32 and 34 are connected in series with the induction heating stations B, C and D respectively. Further, each of the stations B, C and D are provided with linear, variable induction devices 40, 42 and 44 respectively connected in parallel across the resistance 20, inductive reactance 22 and capacitor 24. The variable inductance devices 30, 32, 34, 40, 42 and 44 may be of similar construction or may be varied according to the demands of the apparatus A. The variable induction devices 40, 42 and 44 may be automatically controlled to change the inductive reactance of the individual stations as the power factor varies from a pre-selected value. This arrangement is a substantial improvement over saturable reactors in the position of the devices 30, 32, 34, 40, 42 and 44 or over the use of a bank of non-variable inductance devices that had the disadvantage of requiring complicated switches and switching circuits.

In operation, the linear, variable inductance devices 30, 32 and 34 are readily adjustable, in a manner to be hereinafter described in detail, so that the power to the stations B, C and D are individually controlled. To maintain a substantially constant power factor, the variable induction devices 40, 42 and 44 are adjustable either manually or automatically. By such arrangement of linear, variable inductance devices, convenient and accurate control may be maintained over the operation of a plurality of separate induction heating devices supplied with power by a single generator, such as generator 10.

Figure 2:
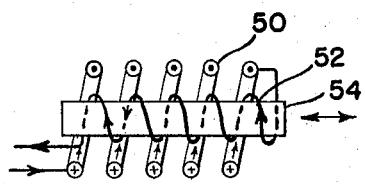
FIGURE 2 is a somewhat schematic side elevation view illustrating the preferred embodiment of the present invention.

In addition, the present invention is directed toward a linear, variable inductance device having a novel construction wherein a high ratio between maximum inductance and minimum inductance is provided for the adjustable range of the device so that adequate adjustment may be made in the parameters of the electrical circuit shown in FIGURE 1 to control the power factor and power distribution of the induction heating apparatus A. In accordance with the preferred embodiment of the present invention, as shown in FIGURE 2, the variable inductance device comprises telescoping coils 50, 52, the latter of which is mounted on appropriate insulated core 54 and is movable into and out of the coil 50. By appropriate winding of the telescoping coils, the current flow, and the magnetic field around the separate coils oppose each other in the overlapping region of the two coils. Accordingly, a low inductance results when the coil 52 is completely telescoped into coil 50; and, as the coil 52 is removed, the portion of overlapping coils and opposing magnetic fields, is reduced to increase the inductance of the device. After the coil 52 is completely removed, the inductance of the device is the combined inductance of both coils because the magnetic field of the coils no longer oppose each other. By this construction, movement of core 54 varies the inductance of the device shown in FIGURE 2 over a wide range and adapts this preferred embodiment for use in the apparatus A.

Figure 3:
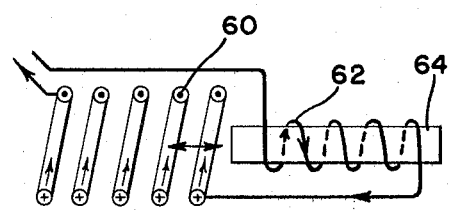
FIGURE 3 is a somewhat schematic side elevation view illustrating a modification of the preferred embodiment shown in FIGURE 2.

In accordance with a slight modification of the preferred embodiment as shown in FIGURE 2, FIGURE 3 shows a variable inductance device having telescopic coils 60, 62, similar to coils 50, 52 in FIGURE 2; however, the inner coil 62 is wound on insulated core 64 in phase with the coil 60 so that, as the coils are telescoped, the magnetic fields created by current flowing in coils 60, 62 add to each other and thereby increase the inductance of the coil. Accordingly, with coil 62 completely retracted from coil 60, a minimum inductance is provided and depends on the inductance of the two coils connected in series. As coil 62 is telescoped within coil 60, the magnetic fields of each coil add to each to increase the inductance of the total device and a maximum inductance is provided when the coil 62 is completely telescoped within the coil 60.

Figure 4:
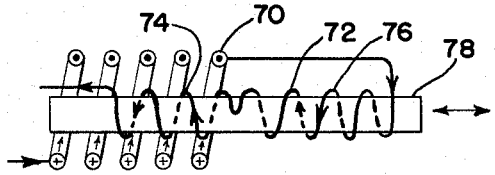
FIGURE 4 is a somewhat schematic side elevation view illustrating another modification of the preferred embodiment shown in FIGURE 2.

FIGURE 4 shows a variable induction device having an extremely large range of maximum to minimum inductance and is especially well adapted for use in the induction heating apparatus A. As is shown, there is provided an outer coil 70 and an inner coil 72 having a first portion 74 out of phase with the coil 70 and a second portion 76 in phase with coil 70. The coil 72 and portions 74, 76 are appropriately mounted on an insulating core 78 so that coil 72 may be appropriately telescoped within coil 70. In the position shown in FIGURE 4, the magnetic field created by the out of phase portion 74 opposes the magnetic field created by the current in coil 70 and a minimum inductance is realized from the device. This portion 74 functions similar to the preferred embodiment illustrated in FIGURE 2. As the coil 72 is moved to the left through coil 70, a lesser amount of portion 74 is within coil 70 and the portion 76 commences to move into coil 70; therefore, since portion 76 is in phase and has a current flow causing a magnetic field which augments the magnetic field of coil 70, the inductance of the device increases to the maximum when portion 74 is completely removed from coil 70 and portion 76 is therein.

The linear, variable induction devices shown in FIGURES 2-4 have a substantial range of inductance and by incorporating the two phase inner coil as shown in FIGURE 4, a substantially larger range of inductance is obtained than was possible by prior linear, variable inductance devices. These devices are linear because the variations of inductance is not accomplished by saturation as is the case in a saturable reactor.

Figure 5:
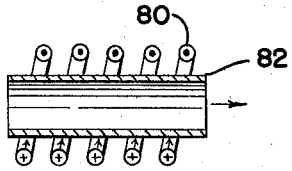
FIGURE 5 is a somewhat schematic side elevation view illustrating another preferred embodiment of the embodiment shown in FIGURE 2.

Referring to the preferred embodiment shown in FIGURE 5, there is provided a linear, variable induction device comprising an outer coil 80 and a telescoping, electrically conductive, non-magnetic sleeve 82 adapted to be moved into and out of the coil 80. When the sleeve 82 is positioned within the coil 80, a voltage is induced into the sleeve which voltage causes a circumferential current flow in the opposite direction of the current flowing in coil 80. This current flow in the sleeve generates a magnetic field which opposes the magnetic field of the coil 80 and decreases the inductance of the coil. As the sleeve 82 is retracted from the coil 80, a lesser opposing magnetic field acts on the magnetic field of the coil 80 and, accordingly, the inductance of the coil is increased.

Figure 6:
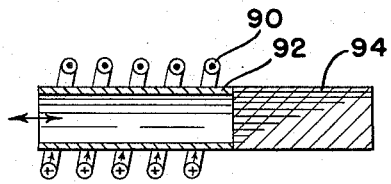
FIGURE 6 is a somewhat schematic side elevation view illustrating a modification of the preferred embodiment shown in FIGURE 5.

A modification of the preferred embodiment shown in FIGURE 5 is disclosed in FIGURE 6 wherein there is provided an outer coil 90, a telescoping, electrically conductive, non-magnetic sleeve 92 joined to a magnetic core 94 formed of appropriate ferro-magnetic material such as iron powder or iron lamina. As the sleeve 92 is retracted from the coil 90, the ferro-magnetic core 94 is moved within the coil. By this arrangement, the decreasing effect of sleeve 92 increases the inductance of coil 90 and the core 94 further assists in this increase of inductance. By providing the tandem core 94 on sleeve 92, a substantially larger range of variable inductance is obtained.

Figure 7:
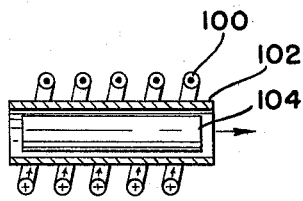
FIGURE 7 is a somewhat schematic view illustrating a further modification of the preferred embodiment shown in FIGURE 5; and, FIGURE 8 is a somewhat schematic side elevation view illustrating another preferred embodiment of the present invention.

A further modification of the preferred embodiment shown in FIGURE 5, and quite similar to the modification of FIGURE 6, is shown in FIGURE 7 wherein the coil 100 has positioned therein a telescopic, electrically conductive non-magnetic sleeve 102 into which there is positioned a ferro-magnetic core 104 similar to core 94 shown in FIGURE 6. In the position shown in FIGURE 7, the sleeve 102 functions as sleeve 82 to provide a minimum inductance and core 104 is shielded from substantially affecting the inductance of coil 100. As the sleeve 102 is progressively removed from coil 100, the magnetically permeable core 104 is exposed to the coil 100 which causes an increase in inductance of the coil. To augment this increase by exposure of the coil to the core 104 as the sleeve 102 is removed from the coil, a lesser opposed magnetic field results from current flowing the sleeve.

Figure 8:
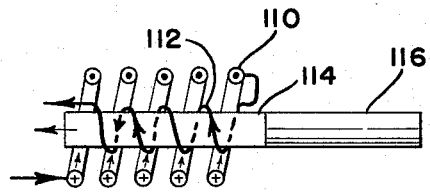

Referring now to FIGURE 8, there is shown a further modification of the variable inductance device which is quite similar to the device shown in FIGURE 6. As is illustrated in FIGURE 8, the variable inductance device comprises an outer coil 110 an inner telescoping coil 112 having an opposite phase than the outer coil 110 and mounted on an insulating core 114 which has tandemly secured thereto a ferro-magnetic core 116. The operation of this variable induction device need not be described in detail since it corresponds with the operation of FIGURE 6.

The present invention has been described in connection with certain structural embodiments; however, it is to be appreciated that the invention is not to be limited by these structural embodiments and various changes may be made without departing from the intended spirit and scope of the invention as defined in the appended claims.

Having thus described my invention, I claim:

1. In an induction heating apparatus including a high frequency power source, an inductive load connected to said power source and means for compensating for variations in the inductive reactance of said load, the improvement comprising: said compensating means being substantially linear in operation and comprising a first and second coil connected in electrical series, said first coil having an axial opening and means for progressively moving said second coil axially into and out of said opening to control the inductance across said two ends, said two coils being electrically connected with said inductive load to change the effective inductance of said load as said second coil is moved with respect to said first coil.

2. The improvement as defined in claim 1 wherein said first and second coils have opposite mechanical phase relationship whereby the flux created by current flow through said coils is subtractive when said second coil is moved into said first coil.

3. The improvement as defined in claim 1 wherein said linear compensating means is connected in electrical parallel with said load.

4. The improvement as defined in claim 1 wherein said linear compensating means is connected in electrical series with said load.

References Cited by the Examiner

UNITED STATES PATENTS

| | | | |
|---|---|---|---|
| 1,948,704 | 2/34 | Fischer | 323—76 |
| 2,141,573 | 12/38 | Vogt | 336—119 |
| 2,334,178 | 11/43 | Dodge | 336—129 |
| 2,604,575 | 7/52 | Williamson | 219—10.77 |
| 2,856,499 | 10/58 | Stanton et al. | 219—10.77 |

FOREIGN PATENTS

| | | |
|---|---|---|
| 482,756 | 4/38 | Great Britain. |

RICHARD M. WOOD, *Primary Examiner*.